May 21, 1968 W. K. GAUTHIER 3,384,077
ABDOMINAL RETRACTOR DEVICE
Filed Jan. 22, 1965 5 Sheets-Sheet 1
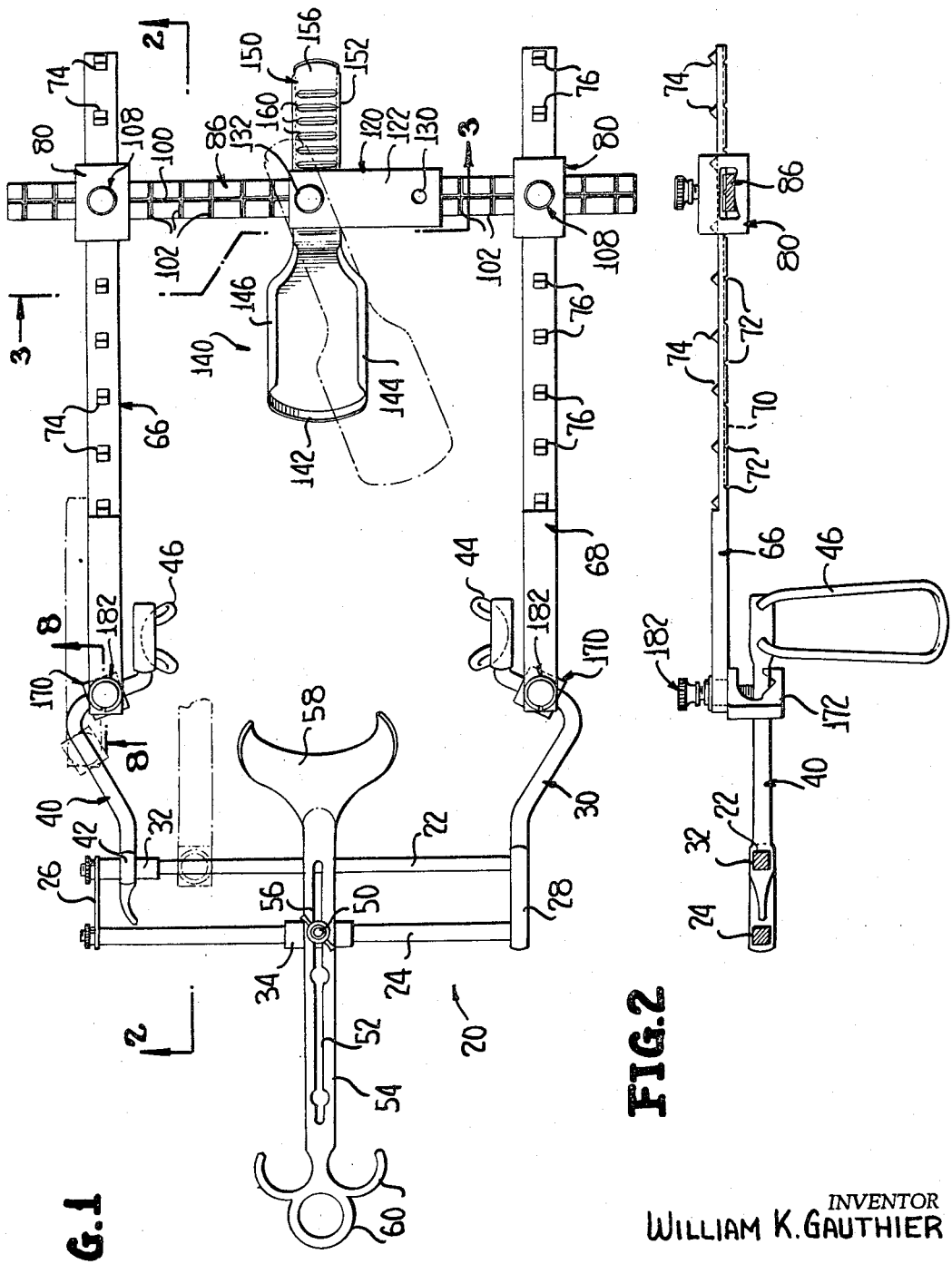
INVENTOR
WILLIAM K. GAUTHIER
BY *Shoemaker and Mattare*
ATTORNEYS

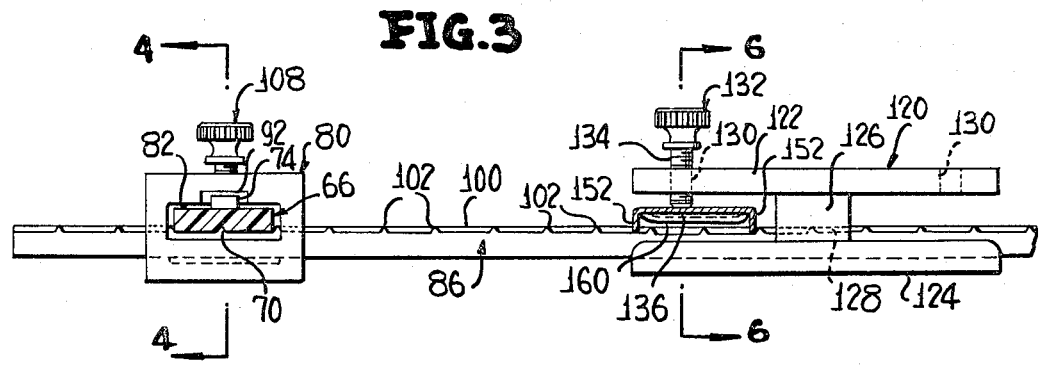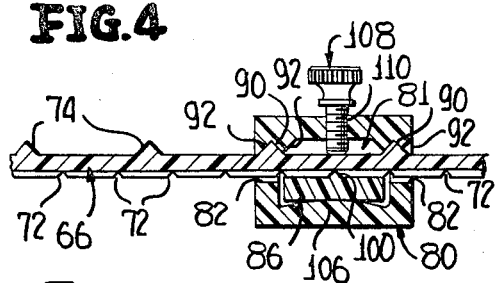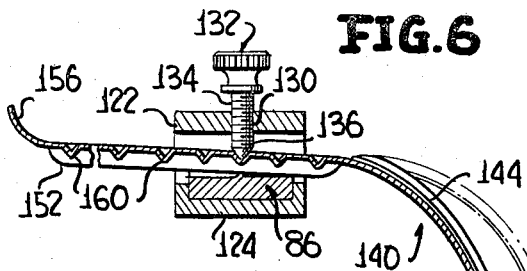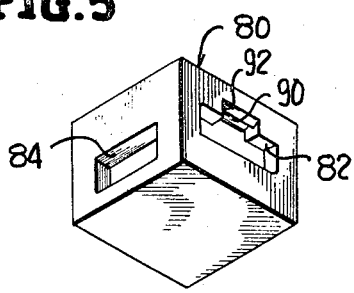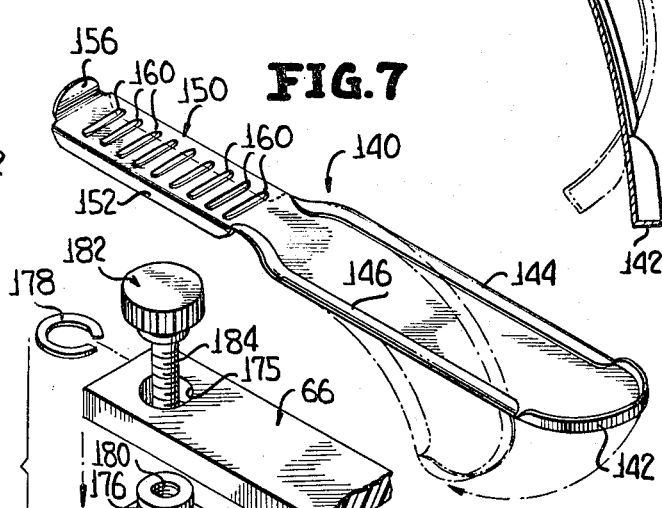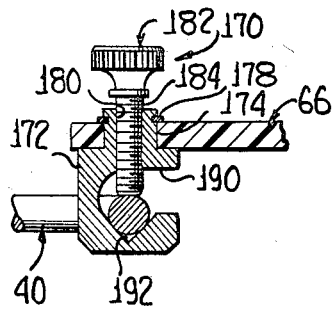

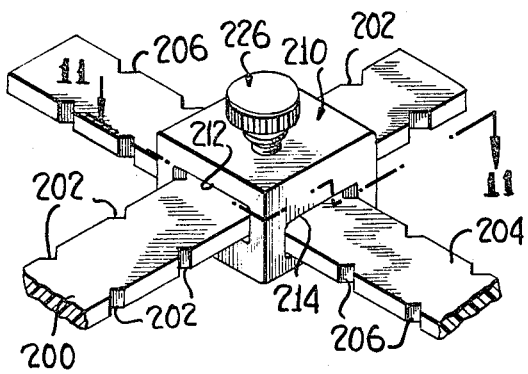
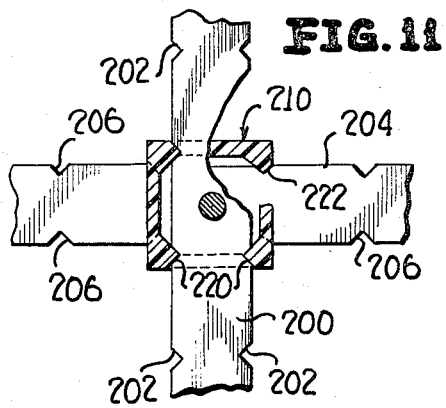
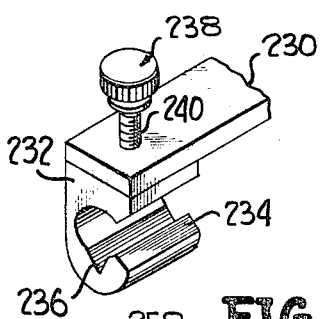
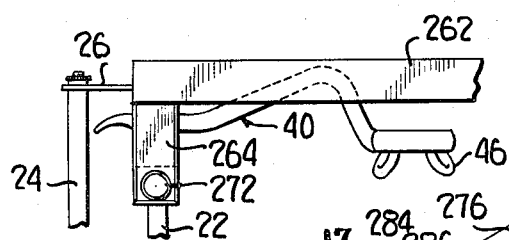
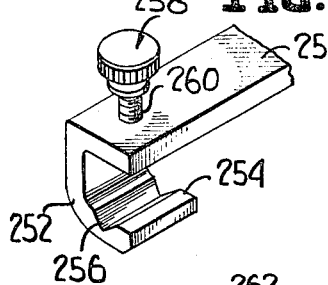
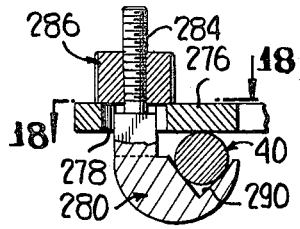
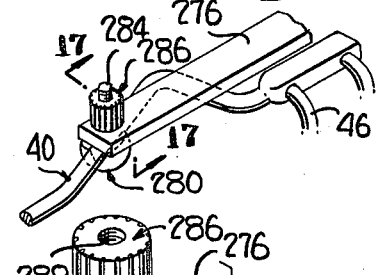
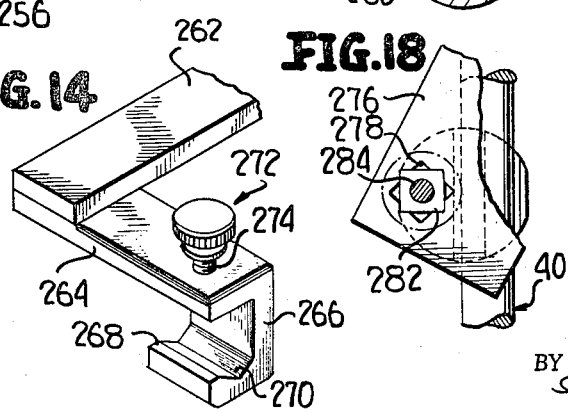
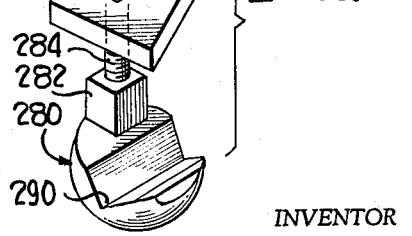
INVENTOR
WILLIAM K. GAUTHIER
BY Shoemaker and Mattare
ATTORNEYS May 21, 1968 W. K. GAUTHIER 3,384,077
ABDOMINAL RETRACTOR DEVICE
Filed Jan. 22, 1965 5 Sheets-Sheet 4
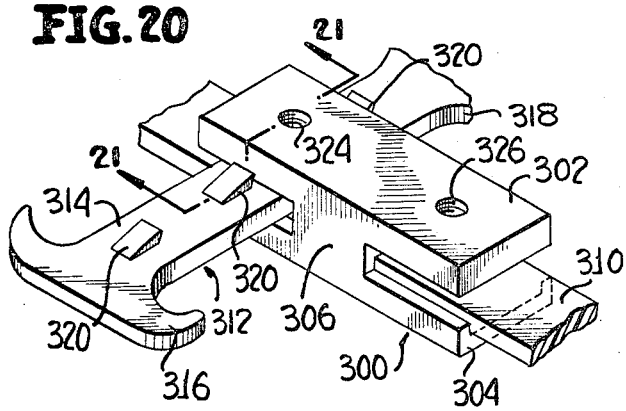
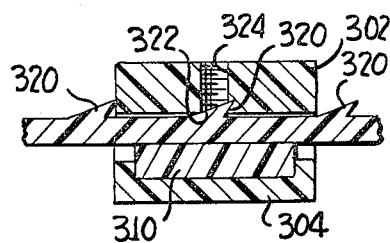
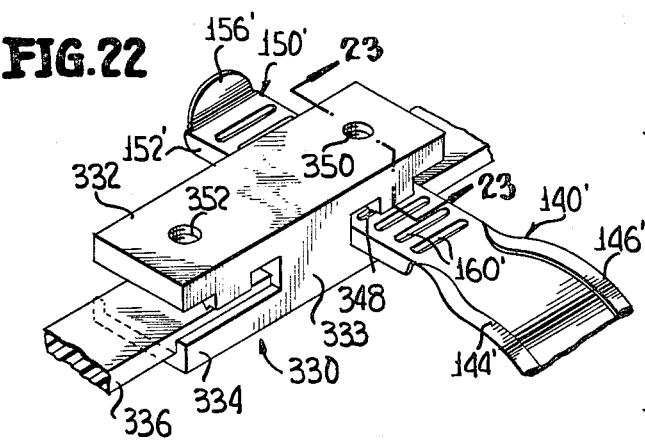
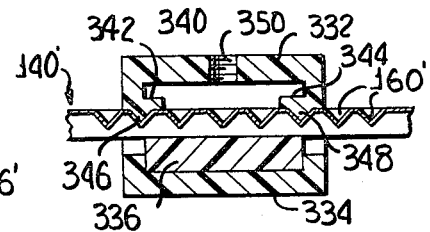
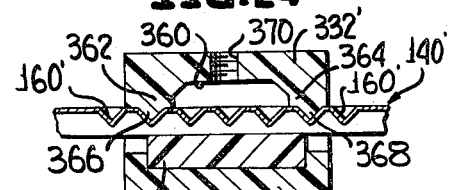
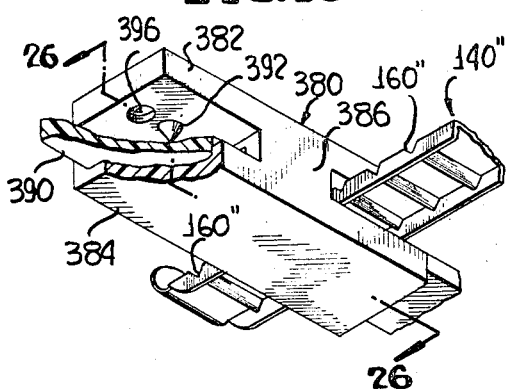
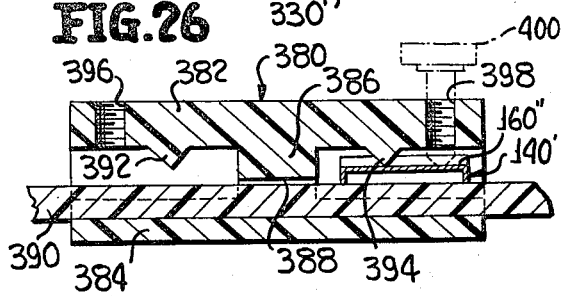
INVENTOR
WILLIAM K. GAUTHIER
BY: *Shoemaker and Mattare*
ATTORNEYS

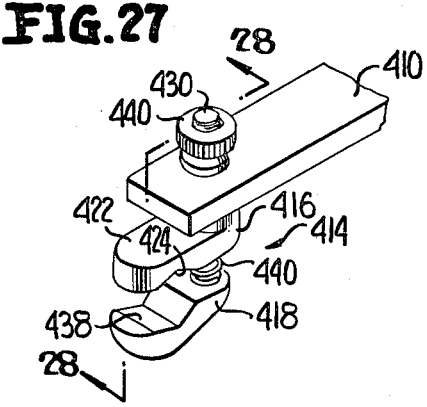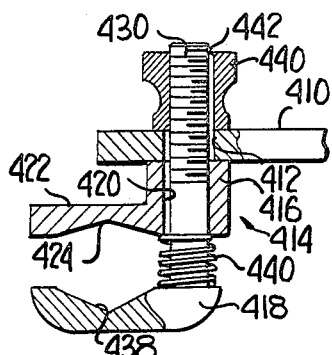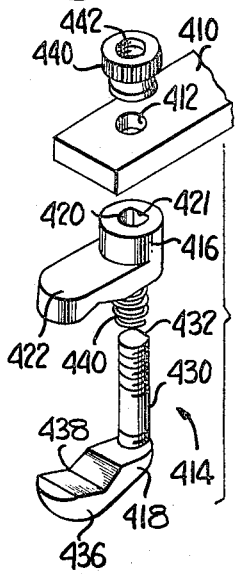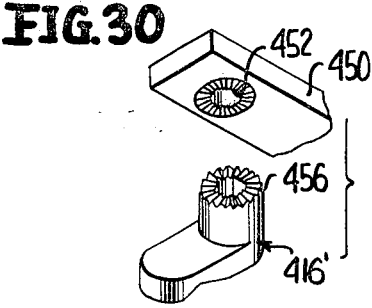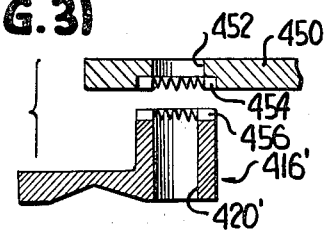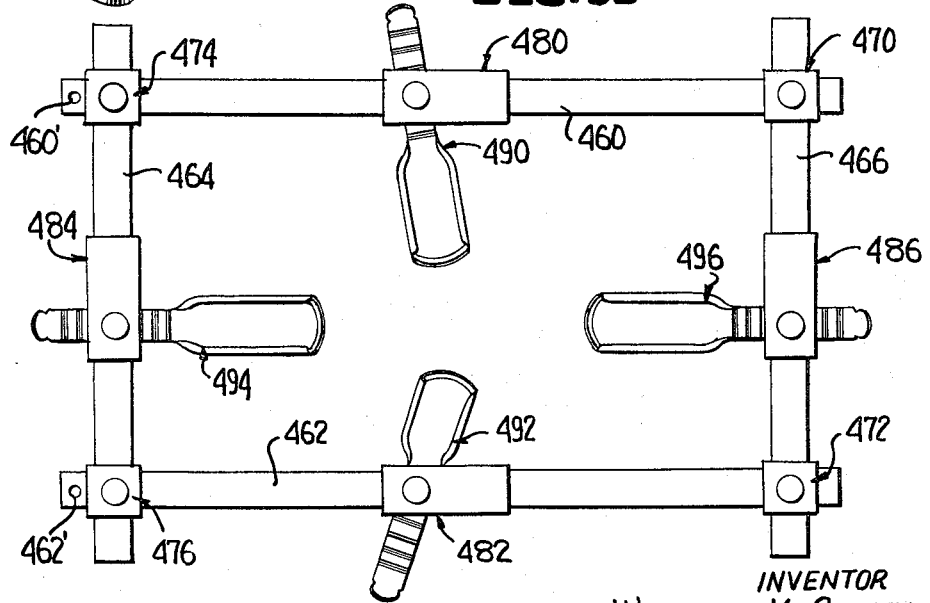

United States Patent Office 3,384,077
Patented May 21, 1968

3,384,077
ABDOMINAL RETRACTOR DEVICE
William K. Gauthier, 310 Codifer Blvd.,
Metairie, La. 70005
Filed Jan. 22, 1965, Ser. No. 427,329
18 Claims. (Cl. 128—20)

ABSTRACT OF THE DISCLOSURE

A retractor device includes spaced side arms and connector means adjustably connected with the spaced side arm means. These spaced side arm means may be releasably connected with a conventional retractor in various angular positions. Blade clamp means is adjustably supported on said connector means or spaced side arm means and a retractor blade is adjustably clamped in place by the blade clamp means and may be angularly adjusted with respect thereto.

---

The present invention relates to an abdominal retractor device and more particularly to retractor means for use in surgery and attachment means therefor.

The arrangement as shown in the instant application represents an improvement over the structure illustrated and described in copending patent applications Ser. Nos. 161,634, now Patent No. 3,168,093 and 242,241, now Patent No. 3,227,156.

It is an object of the present invention to provide an abdominal retractor that may be readily used to produce traction in any particular direction and so that the retractor will properly retain the engaged tissues surrounding an incision during the performance of surgery on a patient.

It is another object of the present invention to provide a retractor attachment that may be readily used with conventional and standard retractors in present day use, such as devices commonly known in the art as Balfours or Balfour retractors.

It is another object of the present invention to provide a retractor attachment for use with retractor devices commonly used in surgery that may be readily used with a standard retractor blade commonly known as a Deaver.

It is another object of the present invention to provide a retractor attachment for well known retractors for properly retaining in a spread-apart position the portions of the body surrounding an incision to permit surgery to be performed while eliminating the necessity for maintaining access to the incision by having a person manually hold or spread the portion of the incision upon which it is necessary to operate.

It is another object of the present invention to provide novel retractor attachments for use with present day surgical instruments for maintaining an incision open so that the surgeon has access thereto, which devices may be interchangeable with one another and used with well known surgical devices now in use.

It is still another object of the invention to provide a retractor attachment that may be readily attached to and detached from a retractor and which will give an equal or balanced traction force around all portions of the incision.

It is yet another object of the present invention to provide retractor attachments that may be detachably connected to a retractor at different positions thereon.

It is still another object of the invention to provide a retractor attachment that may be used by itself as a retractor, or in combination with a standard retractor.

It is still yet another object of the present invention to provide novel retractor attachments that may be readily adjusted to produce traction in any particular desired direction, and which can be readily adjusted to attain these results around an incision whether the incision be small or large.

It is still another object of the invention to provide novel retractor attachments in which the parts are interchangeable with one another, which is of simple design and of economical construction, is of light weight, and is durable and reliable in use.

It is yet another object of the invention to provide a surgical retractor which is composed of plastic thereby making the retractor light in weight, economical to construct and easy to clean and sterilize.

A further object of the invention is to provide a retractor means having side arm means including adjustable connecting means at one end thereof, such adjustable connecting means being pivotally mounted with respect to its associated arm means so as to permit attachment to the rigid arms of a conventional retractor regardless of the angular relationship between the rigid arms of the conventional retractor and the arm means of the retractor attachments according to the present invention.

Still another object of the invention is the provision of a retractor means including releasable connecting means having a novel arrangement for positively clamping the arm means thereof to the rigid arms of a conventional retractor.

Yet another object of the invention is to provide a retractor means including offset portions so as to permit attachment to various parts of another retractor.

A further object of the invention is the provision of a retractor including novel means of attaching the connector means thereof to the side arm means of the arrangement so that these components may be readily adjusted with respect to one another and held in a desired operative relationship.

Yet another object of the invention is to provide a new and improved means of mounting retractor blade means on a supporting portion of a retractor device, and further wherein a unique construction of the retractor blade means itself is provided.

A still further object of the invention is the provision of a novel retractor arrangement which comprises a self-contained unit which will completely replace conventional retractors and which is not limited in its use to the abdomen, but which may be used in thoracic and cardiac surgery as well as in various other applications.

Other objects and many attendant advantages of the invention will become more apparent when considered in connection with the specification and accompanying drawings, wherein:

FIG. 1 is a top view of the improved Deaver retractor type arrangement of the present invention shown in operative connected relationship with a conventional Balfour retractor;

FIG. 2 is a sectional view taken substantially along line 2—2 of FIG. 1 looking in the direction of the arrows;

FIG. 3 is a sectional view taken substantially along line 3—3 of FIG. 1 looking in the direction of the arrows FIG. 4 is a sectional view taken substantially along line 4—4 of FIG. 3 looking in the direction of the arrows;

FIG. 5 is a bottom perspective view of one of the bodies comprising the attaching means for securing the spaced side arm means to the interconnecting connector means FIG. 6 is a sectional view taken substantially along line 6—6 of FIG. 3;

FIG. 7 is a top perspective view of the new and improved retractor blade means of the present invention;

FIG. 8 is a sectional view taken substantially along line 8—8 of FIG. 1 looking in the direction of the arrows;

FIG. 9 is a top exploded perspective view of the structure shown in FIG. 8;

FIG. 10 is a top perspective view illustrating a modified form of the invention;

FIG. 11 is a sectional view taken substantially along line 11—11 of FIG. 10 looking in the direction of the arrows;

FIG. 12 is a top perspective view of a further modified form of the invention;

FIG. 13 is a top perspective view of a still further modified form of the invention;

FIG. 14 is a top perspective view of a still further modified form of the invention;

FIG. 15 is a top view illustrating the modification as shown in FIG. 14 in operative position;

FIG. 16 is a top perspective view of yet a further modification of the invention;

FIG. 17 is a sectional view taken substantially along line 17—17 of FIG. 16 looking in the direction of the arrows;

FIG. 18 is a sectional view taken substantially along line 18—18 of FIG. 17 looking in the direction of the arrows;

FIG. 19 is a top exploded perspective view illustrating the components shown in FIGS. 17 and 18;

FIG. 20 is a top perspective view of a modification of the invention illustrating a different manner of securing a retractor blade in place in a blade clamp means;

FIG. 21 is a sectional view taken substantially along line 21—21 of FIG. 20 looking in the direction of the arrows;

FIG. 22 is a top perspective view of a still further modified arrangement of holding the retractor blade in place within the associated blade clamp means;

FIG. 23 is a sectional view taken substantially along line 23—23 of FIG. 22 looking in the direction of the arrows;

FIG. 24 is a sectional view similar to FIG. 23 illustrating a further modification;

FIG. 25 is a bottom perspective view partly broken away illustrating a still further arrangement for attaching a retractor blade to a blade clamp means;

FIG. 26 is a sectional view taken substantially along line 26—26 of FIG. 25 looking in the direction of the arrows;

FIG. 27 is a top perspective view of a further modified form of the releasable connecting means which may be associated with the side arm means;

FIG. 28 is a sectional view taken substantially along line 28—28 of FIG. 27 looking in the direction of the arrows;

FIG. 29 is a top perspective exploded view of the structure shown in FIGS. 27 and 28;

FIG. 30 is an exploded view of a further modified form of the releasable connecting means;

FIG. 31 is a sectional view illustrating the components shown in FIG. 30 in section; and FIG. 32 is a top plan view of a self-contained retractor according to the present invention.

Referring now particularly to FIGS. 1 and 2 of the drawings, a conventional Balfour retractor is indicated generally by reference numeral 20 and includes two parallel cross bars 22 and 24 rigidly connected together at one end by a strut member 26 and being rigidly connected at the opposite end thereof by an end portion 28 of an arm 30 which extends generally in a direction perpendicular to the cross bars.

The cross bars 22 and 24 are preferably of rectangular cross sectional configuration and slidably receive sleeves 32 and 34 each of which is provided with a rectangular passage formed therethrough.

A movable arm indicated by reference numeral 40 has one end portion 42 thereof fixedly connected to the slidable sleeve 32, the remainder of arm 40 extending generally perpendicularly away from bars 22 and 24 and in parallel and opposing relationship to arm 30. Each of arms 30 and 40 have a generally cylindrical outer surface or may be provided with an oval cross sectional configuration so as to provide an arcuate outer surface. Generally U-shaped retractor blades or hooks 44 and 46 are secured to the outer ends of arms 30 and 40 respectively and extend downwardly therefrom.

The center of sleeve 34 has a threaded stud 50 secured thereto and projecting upwardly therefrom through a slot 52 formed in a bar 54. A concave retractor blade 58 is connected to one end of bar 54 and extends downwardly therefrom to define a lower reversely turned portion for holding tissue in a well known manner. Finger grip portions 60 are provided at the opposite end of bar 54. A wing nut 56 is threaded on stud 50 and is adapted to clamp bar 54 in desired operative relationship with respect to sleeve 34.

As seen particularly in FIGS. 1 through 5 inclusive, a pair of side arm means are indicated generally by reference numerals 66 and 68. Each of these side arm means has a generally rectangular cross sectional configuration, and these side arm means are provided with a unique construction throughout a major portion of the length thereof. Side arm means 66 is provided with a longitudinally extending groove 70 extending along the undersurface thereof substantially midway between the opposite side edges thereof. The undersurface of side arm means 66 is also provided with a plurality of spaced laterally extending grooves 72 extending from side to side thereof and also extending in a direction substantially perpendicular to that of groove 70. Both grooves 70 and 72 have a substantially V-shaped cross sectional configuration. The undersurface of side arm means 68 is provided with the identical construction as side arm means 66.

The side arm means 66 and 68 are provided with projections 74 and 76 respectively on the upper surfaces thereof. These projections 74 and 76 are all of substantially V-shaped cross sectional configuration and extend along the central portion of the respective side arm means and are spaced in such a manner as to cooperate with recesses provided in the attaching means hereinafter described.

A pair of identical attaching means are indicated by reference numerals 80 and a description of one of these will suffice since they are of identical construction. These attaching bodies 80 as well as the side arm means and the connecting means hereinafter described are all formed of a suitable material such as plastic which is sufficiently resilient to allow the members to snap into operative relationship with respect to one another. Each of bodies 80 is provided with a central cavity 81 therewithin, and a pair of passages 82 and 84 provide access to the central cavity, it being understood that passage 82 comprises openings formed in the opposite side walls of body 80 as does passage 84 such that the side arm means as well as the connector means 86 is adapted to extend through these passages. The side arm means are adapted to extend through the passage 82 in each body means while the connector means 86 is adapted to extend through the passage 84 in each of the body means, it being noted that passage 84 is disposed vertically below passage 82.

As seen particularly in FIGS. 3, 4 and 5, the upper surface of passage 82 at either side of the body means in the opposite walls thereof is provided with recesses 90 of substantially V-shaped cross sectional configuration which are complementary to the projection 74 provided on the upper surface of side arm means 66. The adjacent wall portions 92 are tapered downwardly, and it will be apparent that with this arrangement, the projections 74 are adapted to snap into the recesses 90 provided in the attaching means so as to resiliently maintain the side arm means in a particular adjusted relationship with respect to the attaching means and the associated connector means as will hereinafter become more apparent.

The upper surface of connecter means 86 is provided with a longitudinally extending rib 100 extending substantially midway between the opposite side edges thereof, and a plurality of spaced laterally extending ribs 102 are provided, these ribs extending substantially perpendicularly to rib 100. Ribs 100 and 102 are adapted to be received within the grooves 72 and 70 respectively provided in side arm means 66, the shape and spacing of the ribs 100 and 102 being such as to permit the ribs to fit snugly within the grooves provided in the side arm means. This arrangement enables the side arm means and the connector means to be additionally held in a desired operative adjusted relationship with respect to one another. It will be noted that connector means 86 is of substantially rectangular cross sectional configuration and is adapted to slide within its passage 84 in the attaching means.

As seen particularly in FIG. 4, the bottom wall of attaching means 80 is of substantially arcuate configuration and bears against the undersurface of connector means 86 so as to maintain it in frictional contact with the overlying side arm means. It is apparent that when in the operative position, the side arm means and the connector means will be maintained resilient in operative relationship as illustrated.

In addition, a screw member 108 is provided with a lower threaded shank portion 110 which is threaded downwardly through a suitable threaded opening provided in the upper wall of body means 80. This screw member 108 provides a manually adjustable means for positively clamping the side arm means in a desired operative position relative to the connector means, and the members will remain positively locked in this adjusted position until screw member 108 is backed off.

A blade clamp or means for mounting a retractor blade on the connector means is indicated generally by reference numeral 120, this blade clamp including an upper arm portion 122 and a lower arm portion 124 disposed substantially parallel with one another and being interconnected by a central substantially vertically extending post portion 126. The lower arm portion 124 is of generally channel shape cross sectional configuration as seen in FIG. 6, and the central post portion 126 is provided with a channel 128 formed therethrough such that the blade clamp is adapted to slidably receive the connector means 86 whereby the blade clamp can be mounted in any desired position along the connector means.

The upper arm portion 122 is provided with a pair of spaced threaded openings 130 adapted to receive a screw means 132 having a lower threaded shank portion 134 which terminates in a sharp pointed lower end portion 136 for a purpose hereinafter described.

Referring now particularly to FIGS. 1, 6 and 7 of the drawings, a new and improved retractor blade according to the present invention is indicated generally by reference numeral 140. This retractor blade is formed of a resilient deformable material such as stainless steel or the like which is resistant to corrosion and which may be readily manually bent into a desired operative position. This is a highly desirable feature since it permits the retractor blade to be readily manually moved to the exact extent required to hold the tissues in place.

The retractor blade may initially have a substantially flat configuration as shown in FIG. 7 disregarding the various bent portions around the edges thereof, and the blade may then be manually deformed throughout the lower operative portion thereof into the dotted line positions as well as the full line position shown in FIGS. 6 and 7.

The lower operative end of the blade is provided with an arcuate bent-up flange 142 for strengthening this end of the blade and also to prevent any sharp edges therealong. The side edge portions 144 and 146 of the lower operative portion of the blade are also bent up so as to provide a smooth surface to prevent damage to the adjacent tissues when in operative position.

The blade also includes a substantially flat clamping portion 150 having down-turned flanges 152 at opposite sides thereof, the end of clamping portion 150 being turned upwardly as indicated at 156 to provide a manual grasping portion.

A plurality of substantially parallel laterally extending grooves 160 are provided along the clamping portion 150, each of these grooves having a substantially V-shaped cross sectional configuration. When in operative position as shown in FIGS. 3 and 6, the retractor blade 140 is held in operative position by means of the screw 132, the sharp pointed lower end portion 136 of which is adapted to fit snugly within one of the grooves 160 provided in the retractor blade. Screw 132 will additionally serve to clamp the blade clamp 120 in a particular position relative to the connector means 86.

A particular advantage of the provision of the V-shaped grooves 160 and the cooperating sharp lower pointed end 136 of the screw means is the fact that it permits the retractor blade 140 to be readily adjusted for swinging movement, or in other words the retractor blade is adapted to pivot about the axis of screw 132 into a desired operative position as indicated for example in phantom lines in FIG. 1. Accordingly, the lower pointed end of screw 132 permits ready adjustment of the retractor blade and then further may be tightened to tightly clamp the components in the desired operative position. It is also apparent that a pair of retractor blades may be mounted in the blade clamp 120 at either side of the central post portion 126 if desired.

When in the operative clamped position as seen in FIG. 6, it will be noted that the lower edges of the flange portions 152 of the retractor blade rest upon the upper portion of connector means 86, and the blade clamp is in turn drawn tightly against the undersurface of the connector means for locking the various elements in such position.

Each of the side arm means 66 and 68 is provided with releasable connecting means 170 at the opposite ends thereof for operatively mounting the retractor of the present invention to the Balfour retractor 20. The releasable connecting means 170 are identical in each case, and accordingly, a description of one will suffice for both, and this particular connecting means permits the side arm means to be mounted at various positions on the Balfour retractor regardless of the angular relationship between the arm portions of the Balfour retractor and the spaced side arm means 66 and 68.

Referring now particularly to FIGS. 8 and 9 of the the drawings, the releasable connecting means 170 includes a body portion 172 which may be formed either of metal or plastic as desired, this body portion including a reduced substantially cylindrical upper portion 174 which is adapted to be rotatably and snugly received within a hole 175 provided in side arm means 66. A groove 176 is provided in the upper portion 174 and extends circumferentially therearound, this groove receiving a snap ring 178 for holding the body means 172 in the operative position shown in FIG. 8.

The central portion of body means 172 and portion 174 thereof is provided with a vertically extending threaded hole 180. A screw member 182 is provided with a lower threaded shank 184 which is adapted to be threaded within hole 180 as seen in FIG. 8. The body means 172 is provided with a recess 190 opening through one side thereof, the lower portion of this recess being provided with a groove 192 of substantially V-shaped cross sectional configuration. This groove is adapted to receive an arm 40 of the Balfour retractor, and as seen in FIG. 8 the lower end of screw 182 is adapted to tightly clamp arm 40 within the V-groove portion 192 of body means 172. The provision of the V-shaped groove provides a better and more positive clamping action between the side arm means and the member upon which it is mounted, and the V-groove more positively prevents the arm 40 from sliding out of clamped position as shown.

In other words, this V-groove configuration is considered superior to a smooth bottom surface in the recess 190 since it ensures that the parts cannot become accidentally dis-engaged by relative slippage therebetween.

Referring now particularly to FIGS. 10 and 11 of the drawings, a modified form of the invention is illustrated, wherein a side arm means 200 similar to one of the side arm means illustrated in FIG. 1 is provided with a plurality of substantially V-shaped notches or recesses 202 formed along the opposite side edges thereof, the side arm means being of substantially cross sectional configuration as in the previously described modification.

The connector means 204 which corresponds to member 86 shown in FIG. 1 is also of substantially rectangular cross sectional configuration and is provided with a plurality of longitudinally spaced V-shaped notches or recesses 206 formed along the opposite side edges thereof.

An attaching means or body 210 corresponds to means 80 shown in FIG. 1, attaching body 210 having a first passage 212 formed therethrough for receiving the side arm means 200, and also includes a second passage means 214 formed therethrough at right angles to passage 212, passage 214 receiving the connector means 204.

As seen particularly in FIG. 11, the passage means 212 formed in the opposite side walls of attaching body 210 is provided with inwardly extending projections 220 which are adapted to fit snugly within the recesses 202 formed in the side arm means for permitting the side arm means to be snapped into desired operative position.

The passage means 214 formed in opposite side walls of the attaching body 210 in a like manner includes inwardly extending projections 222 which are adapted to fit snugly within the recesses 206 formed in the opposite sides of connector means 204 to likewise permit the connector means to be snapped into operative position.

It is apparent that the recesses and projections provided in the modification shown in FIGS. 10 and 11 serve the same general purpose as the recesses and projections provided in the previously described modification. A clamping screw 226 is threaded downwardly through a central threaded opening provided in attaching means 210, screw 226 being identical in construction with the screw means 108 previously described to permit the side arm means and connector means to be positively clamped in the desired operative relationship.

Referring now to FIG. 12, a further modified form of the invention is illustrated. In the previously described modification shown in FIG. 1, the releasable connecting means 170 is pivotally secured to the end of the associated side arm means. In the modification shown in FIG. 12, a side arm means 230 corresponds to the side arm means 66 shown in FIG. 1 and a body means 232 comprising the releasable connecting means is fixed to the undersurface of side arm means 230. Body means 234 is provided with a recess 234 which opens laterally through one side thereof, recess 234 being provided with a groove 236 at the lower portion thereof which is of substantially V-shaped cross sectional configuration. A screw 238 is provided with a lower threaded shank portion 240 which is threaded downwardly through a suitable threaded opening provided through members 230 and 232 for positively clamping the end portion of the side arm means to a suitable portion of a Balfour retractor or the like.

Referring now particularly to FIG. 13, a further modified form of the invention is illustrated wherein a side arm means 250 corresponding to the side arm means 230 discussed in connection with FIG. 12 is provided with an integral downwardly extending portion 252 at one end thereof, portion 252 defining a laterally opening recess 254 which has a groove 256 formed at the bottom thereof of substantially V-shaped cross sectional configuration. A screw 258 is provided with a lower threaded shank portion 260 which is threaded downwardly through a suitable threaded opening provided in side arm means 250 for clamping a suitable member such as a rigid arm of a Balfour retractor within the groove portion 256 in a manner similar to that previously described.

Referring now particularly to FIGS. 14 and 15 of the drawings, a still further modified form of the invention is illustrated wherein a side arm means is indicated by reference numeral 262 and corresponds to the side arm means previously described. The side arm means 262 has connected to the inner end thereof a laterally extending offset portion 264 which extends at substantially right angles to the side arm means 262.

The outer end of offset portion 264 includes an integral downwardly extending portion 266 having a laterally opening recess 268 defined therewithin. A groove 270 is formed at the bottom of recess 268 and is of substantially V-shaped cross sectional configuration. A screw 272 is provided with a lower threaded shank portion 274 which is threaded downwardly through a suitable threaded opening provided in offset portion 264 for clamping a suitable portion of a retractor within the recess portion 268 and groove 270.

Referring to FIG. 15, the modification as shown in FIG. 14 is illustrated in operative clamped position on the Belfour retractor as described in connection with FIG. 1. As seen in FIG. 15, the offset portion 264 permits the side arm means not only to be mounted upon the rigid arm 40 of the Balfour retractor, but it may also be mounted on one of the cross bars 22 if desired. It is accordingly apparent that the provision of the offset portion 264 increases the versatility of the arrangement since it may be mounted on various portions of a Balfour retractor and the like.

Referring now to FIGS. 16 through 19 inclusive, a still further modified form of the invention is illustrated wherein a side arm means is indicated by reference numeral 276 and corresponds to the side arm means previously described. Side arm means 276 is provided with a hole 278 formed therethrough, this hole having the general configuration of an eight-sided star and being adapted to receive a polygonal shaped body in different adjusted positions therewithin as hereinafter described.

The releasable connecting means in this particular modification includes a body portion 280 having a reduced upwardly extending portion 282 of generally square cross sectional configuration which in turn joins with a further reduced portion 284 which is threaded and extends upwardly therefrom.

Square shaped portion 282 is adapted to be received within the hole 278 formed in side arm means 276. This operative relationship is shown in FIG. 18. It will be apparent that portion 282 may be received within hole 278 at various different relative positions therewithin so that the angular relationship of body means 280 with respect to the side arm means 276 may be adjusted.

As seen in FIG. 17, the threaded portion 284 extends upwardly a substantial distance above side arm means 276 and is adapted to receive a substantially cylindrical manually operable head member 286 having a central threaded opening 288 formed therethrough which is adapted to be threaded on portion 284. It is apparent that by threading member 286 downwardly along portion 284, the body means 280 may be drawn upwardly toward side arm means 276.

Body means 280 includes a groove portion 290 formed therein, the groove portion being of substantially V-shaped cross sectional configuration and adapted to receive a rigid arm 40 of a Balfour retractor and the like. It is apparent as seen in FIG. 17 that the arm 40 may be tightly clamped between the undersurface of the side arm means 276 and the surfaces of the V-shaped groove 290 formed in the body means.

As seen in FIG. 16, it is apparent that side arm means 276 may be mounted on different portions of the rigid arm 40 of a Balfour retractor, and the body means 280 may be angularly adjusted with respect to the side arm means as necessary in order to obtain the desired clamping relationship.

Referring now to FIGS. 20 and 21 of the drawings, a modification of the invention is illustrated wherein a blade clamp means is indicated generally by reference numeral 300 and includes an upper arm portion 302 and a lower arm portion 304 disposed substantially parallel with the upper arm portion and being interconnected by a central post portion 306 which extends substantially perpendicular to the upper and lower arm portions. The lower arm portion 304 is of generally channel-shaped cross sectional configuration as seen in FIG. 21, and the central post portion 306 is provided with a channel or opening aligned with the channel defined in the lower arm portion such that a connector means 310 is slidably received through the channel in the post portion whereby the blade clamp means may be moved to any desired position along the connector means. It should be understood that the connector means 310 may be any construction such as the connector means previously described.

The blade clamp means is adapted to mount a retractor blade, and the reference numeral 312 indicates generally a member which may either comprise the retractor blade itself or an insert which fits into the clamping portion of a retractor blade. Member 312 includes a clamping portion 314 which joins with an enlarged end portion 316 defining laterally extending ears which are adapted to be engaged by a person's fingers for adjusting the positioning of the retractor blade. The opposite end 318 of the clamping portion flares outwardly, and a plurality of projections 320 are provided on the upper side of the clamping portion, each of these projections having the shape as seen particularly in FIG. 21 which is generally that of a ratchet tooth. These projections 320 are adapted to fit within a recess 322 provided in the undersurface of the upper arm portion 302 at either side of the central post portion 306. A threaded hole 324 is provided through the upper arm portion and opens into the recess 322. This threaded hole is adapted to receive a suitable threaded screw member for additionally clamping the member 312 in place if desired. A similar hole 326 is provided at the other side of the central post portion 306.

The various members of this modification are formed of resilient plastic which permit sufficient deformation to move the member 312 into various adjusted positions wherein one of the projections 320 will fit within the recess 322. A screw member threaded into hole 324 may serve as an auxiliary clamping means to hold the members in adjusted position.

Referring now to FIGS. 22 and 23 of the drawings, a further modified form of the invention is illustrated wherein the blade clamp means is indicated generally by reference numeral 330 and includes an upper arm portion 332 and a lower substantially parallel arm portion 334, these arm portions being joined by a central post portion 333 extending substantially perpendicularly to the arm portions. The lower arm portion 334 is generally channel-shaped in cross sectional configuration, and a channel or passage is provided through the central post portion 333 such that the blade clamp means may be slidably supported on a connector means 336.

A retractor blade is indicated generally by reference numeral 140′ and is identical in construction to the retractor blade shown in FIG. 7 of the drawings, similar parts having been given the same reference numeral primed.

The upper arm portion is provided at either side of the central post 333 with a recess 340 as seen most clearly in FIG. 23, this recess being generally T-shaped in cross section and defining a pair of resilient arm portions 342 and 344 at opposite sides of the upper arm portion respectively, these arm portions including downwardly extending projections 346 and 348 which may be of substantially V-shaped cross sectional configuration.

The projections 346 and 348 are adapted to fit within the substantially V-shaped grooves 160′ provided in the clamping portion 150′ of the retractor blade 140′. Here again, as in the previous modifications, it should be understood that the material of the blade clamp means 330 as well as the connector means 336 of resilient plastic so as to enable the parts to move into the operative position illustrated. It will also be understood that the resilient nature of the material will maintain the elements in the operative clamped position as seen in FIG. 3.

A threaded hole 350 is provided through the upper arm portion and is in communication with recess 340, a similar hole 352 being provided at the opposite side of the central post 333 and being in communication with a similar recess at the opposite side of this central post. The threaded holes are adapted to receive suitable screw threaded members such as screws or the like which can serve as additional clamping means for clamping the elements in the operative relationship illustrated.

Referring now to FIG. 24, a modified form of the invention is illustrated wherein the structure is quite similar to that shown in FIGS. 22 and 23, the blade clamp means 330′ being modified in this illustration to include a recess 360 instead of the recess 340 at either side of the central post thereof. Recess 360 defines downwardly extending wall portions 362 and 364 at opposite sides of the blade clamp means upper arm portion 332′, and walls 362 and 364 include downwardly extending projections 366 and 368 respectively which are adapted to fit within the V-shaped grooves 160′ of the retractor blade 140′ as previously described. A threaded hole 370 is in communication with the central part of recess 360 and is adapted to receive a suitable clamping member such as a threaded screw which can serve to additionally clamp the elements in the operative position shown.

Referring now to FIGS. 25 and 26, a still further modified form of the invention is illustrated wherein the blade clamp means is illustrated generally by reference numeral 380 and includes an upper arm portion 382 and a lower spaced substantially parallel arm portion 384, these two arm portions being joined by a central post portion 386 which extends substantially perpendicularly to the arm portions. Post portion 386 is provided with a channel or passage 388 therethrough, and the lower arm portion 384 is of general channel-shaped cross sectional configuration whereby the blade clamp means is adapted to be slidably mounted upon a connector means 390.

The undersurface of the upper arm portion 382 is provided with a pair of downwardly extending projections 392 and 394 disposed at opposite sides of the central post portion, these downwardly extending projections being substantially frusto-conical in configuration and terminating in a relatively sharp lower point. The upper arm portion is also provided with a pair of threaded holes 396 and 398 at opposite sides of the post portion.

A retractor blade 140′ which is substantially similar to the retractor blade 140 previously described is provided, the only differences in the construction of retractor blade 140″ being the fact that the grooves 160″ thereof extending completely across the clamping portion thereof, these grooves 160″ also being substantially V-shaped in cross sectional configuration.

As seen most clearly in FIG. 26, when the retractor blade is disposed in operative position within the blade clamp means, projection 394 extends downwardly into and fits snugly within one of the V-shaped grooves 160″. This serves to hold the retractor blade in desired operative position, the natural resilience of the plastic components serving to hold the retractor blade in position and also to hold the blade clamp means is positioned along the associated connector means. A suitable screw threaded member such as indicated in phantom line by reference numeral 400 may be threaded within hole 398 so as to engage the retractor blade and to additionally serve to clamp the components in the illustrated operative relationship.

It will be understood from an inspection of FIGS. 20 through 26 inclusive that in each of the modifications, the blade clamp means provides a substantially symmetrical arrangement at either side of the central post portion thereof, and it is possible to mount a retractor blade at either side of the post portion or in some instances to mount two retractor blades simultaneously in an associated blade clamp means.

Referring now to FIGS. 27 through 29 inclusive, a modification is illustrated wherein the side arm means 410 is provided with a hole 412 therethrough adjacent one end thereof, and a modified releasable connecting means is indicated generally by reference numeral 414, this connecting means being pivotally adjustable with respect to the associated side arm means.

The connecting means includes an upper member 416 and a lower member 418, member 416 having a bore 420 formed therethrough which has a flat 421 along one side thereof as seen most clearly in FIG. 29. Member 416 also includes a laterally extending portion 422 which has formed on the undersurface thereof a clamping means in the form of a groove 424 of substantially V-shaped cross sectional configuration.

The member 418 includes an upwardly extending threaded shank portion 430 having a flat 432 along one side thereof which is adapted to fit up against the flat 421 and the bore of member 416 to prevent relative rotation between members 416 and 418.

Member 418 also includes a laterally extending lower portion 436 having formed on the upper surface thereof a clamping portion 438 in the form of a groove of substantially V-shaped cross sectional configuration.

As seen most clearly in FIG. 28, when the elements are in assembled position, the shank portion 430 of member 418 extends upwardly through the bore 420 provided in member 416 and through the hole 412 provided in the side arm means 410. A coil spring 440 is disposed about the lower portion of shank 430 for normally urging members 416 and 418 apart. Interengagement of the flats 421 and 432 prevents relative rotation between members 416 and 418.

A nut member 440 which may be provided with knurls or serrations on the outer surface thereof is also provided with a threaded bore 442 formed therethrough which is adapted to be threaded on the upper threaded end of shank portion 430 of member 418.

It is apparent that any suitable supporting member is adapted to be clamped between the clamped portions 424 and 438, these clamping portions being moved toward one another upon relative rotation of nut member 440 with respect to shank 430, nut member 440 being drawn up until the various elements are clamped in the desired relationship whereupon the releasable connecting means will be tightly clamped to a suitable member and also clamped in fixed relationship on the outer end of the side arm means 410.

Referring now particularly to FIGS. 30 and 31 of the drawings, a modified form of the releasable connecting means shown in FIGS. 27 through 29 is illustrated. In this modification, the side arm means 450 is provided with a hole 452, this construction being similar to that discussed in connection with FIGS. 27 through 29. In this latter modification, the undersurface of side arm means 450 is provided with an annular array of downwardly extending teeth 454 of generally V-shaped cross sectional configuration which surround the lower portion of opening 452.

The connecting means provided in the modification shown in FIGS. 30 and 31 is identical in all respects with that previously illustrated with the exception that the upper member 416' thereof is provided at the upper end thereof with an annular array of upwardly extending teeth 416 of substantially V-shaped cross sectional configuration which surround the open upper end of the bore 420' provided through member 416'.

The operation of the releasable connecting means illustrated in FIGS. 30 and 31 is substantially identical with that discussed in connection with that shown in FIGS. 27 through 29 with the exception that the annularly disposed teeth 454 and 456 are disposed in engagement with one another to positively lock member 416' against rotation with respect to the side arm means 450 once the releasable connecting means has been moved into a desired adjusted relationship with respect to the associated side arm means.

Referring now particularly to FIG. 32 of the drawings, a further modification is illustrated wherein a self-contained retractor unit is provided wherein there is no need of a conventional retractor or attachment, this form of the apparatus being capable of performing the functions of any conventional retractor means. As pointed out previously, this form of the invention is not limited in its use to the abdomen but can as well be used in thoracic and cardiac surgery.

This form of the invention includes a pair of spaced side arm means 460 and 462 having connected therebetween a pair of spaced connector means 464 and 466, it being apparent that the assembled device provides two parallel side arm means and two parallel connector means. The connector means 466 is connected to the side arm means 460 and 462 by a pair of attaching means indicated by reference numerals 470 and 472, and these attaching means may be of a construction similar to that indicated by reference numeral 80 in FIG. 1, for example, although it is apparent that any suitable attaching means may be employed at these locations for adjustably interconnecting the side arm means with the connector means. In a like manner, connector means 464 is adjustably secured to the side arm means by a pair of adjustable attaching means 474 and 476. Side arm means 460 and 462 are provided with holes 460' and 462' respectively at one end thereof for receiving suitable connecting means if it is desired to employ this structure with a conventional retractor means.

With this over-all arrangement, it is apparent that the spacing of the side arm means as well as the spacing of the connector means may be selectively adjusted as desired.

Four blade clamp means are illustrated and indicated generally by reference numerals 480, 482, 484 and 486, these four blade clamp means being adjustably mounted on members 460, 462, 464, and 466 respectively. The construction of these blade clamp means may be similar to any of those previously described, and for example may correspond to the structure illustrated in connection with the embodiment shown in FIGS. 1–6 inclusive.

The blade clamp means serve to support retractor blades 490, 492, 494 and 496 which are mounted within the blade clamp means 480, 482, 484 and 486 respectively. The retractor blade means may be of a construction such as that shown in FIGS. 6 and 7, or any other suitable configuration.

The embodiment illustrated in FIG. 32 would preferably incorporate members formed of stainless steel or plastic, and the retractor blades may be of various shapes and lengths.

It is apparent from the foregoing that there is provided according to the present invention a new and novel abdominal retractor device for use in surgery and which permits traction to be applied in different directions to retain tissues in proper position during an operation. The improved retractor or retractor attachment according to the present invention may be readily used with conventional and standard retractors such as a Balfour retractor. The apparatus of the present invention includes novel releasable connecting means which permits the spaced side arm means of the retractor to be mounted upon various portions of the rigid arms of a Balfour retractor regardless of the angular relationship of the rigid arms of the conventional retractor with respect to the spaced side arm means. The releasable connecting means is also provided with a recess having a V-shaped groove in the lower portion thereof so as to provide a better clamping action and a better grip on the supporting member to ensure that the supporting member will not accidentally slip out of operative position. One modification of the present invention includes an offset portion to permit the side arm means to be mounted to various portions of a conventional retractor. The present invention also affords a novel attaching means which permits the side arm means and the connector means to be snapped into desired operative position and to further permit these members to be tightly clamped in fixed relationship. The side arm means and the connector means also include interengaging portions to maintain them in operative relationship. Novel means is also provided for mounting the retractor blade on the connector means, and the retractor blade itself is of a novel configuration which permits ready deformation thereof and which eliminates any sharp edges while reinforcing certain particular portions of the retractor blade.

The present invention also contemplates the provision of a self-contained retractor unit which dispenses with the necessity of providing any conventional retractor means or attachments, and which is capable of performing any function heretofore accomplished with the utilization of conventional retractor means.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Retractor means for surgical use comprising a pair of spaced side arm means, connector means extending between said side arm means, adjustable attaching means for adjustably interconnecting said side arm means with different portions of said connector means, resilient means for maintaining said side arm means in a particular adjusted relationship with respect to said connector means, additional means for clamping said side arm means in a particular adjusted relationship with said connector means, and means at the outer end portions of said side arm means for interconnecting the side arm means with suitable members, said means at the other end of said side arm means including a recess having a groove portion of substantially V-shaped cross sectional configuration, and means for clamping a suitable member within said groove portion, and at least one retractor blade means supported by said retractor means.

2. Retractor means for surgical use comprising a pair of spaced side arm means, connector means extending between said side arm means, adjustable attaching means for adjustably attaching said side arm means to spaced portions of said connector means, said attaching means comprising a body of resilient material having a pair of crossing passages formed therethrough and in direct communication with one another, said connector means extending through one of said passages in each of said attaching means and one of said side arm means extending through the other passage of each of said attaching means, said attaching means and said side arm means as well as the connector means having integral cooperating projections and recesses formed thereon adapted to snap into place with respect to one another for maintaining the side arm means in a particular adjusted relationship with respect to said connector means, and at least one retractor blade means supported by said retractor means.

3. Apparatus as defined in claim 2 wherein said cooperating projections and recesses include projections extending from spaced portions of said side arm means and cooperating recesses formed in portions of said attaching means for receiving said projections.

4. Apparatus as defined in claim 3 wherein said projections as well as said recesses are of substantially V-shaped cross sectional configuration and are complementary to one another for holding the members in a particular relationship with respect to one another.

5. Apparatus as defined in claim 2 wherein said cooperating projections and recesses comprise spaced recesses formed along the side edge portions of said side arm means as well as said connector means, said attaching means having complementary shaped projections formed thereon adapted to fit within said recesses to maintain the side arm means and connector means in a particular operative relationship to one another.

6. Retractor means for surgical use comprising a pair of spaced side arm means, connector means extending between said side arm means, attaching means for adjustably attaching said spaced side arm means to spaced portions of said connector means, said attaching means and said side arm means having cooperating projections and recesses adapted to mate with one another for holding the side arm means in a particular operative relationship with respect to said connector means, said attaching means as well as said side arm means being formed of a resilient material, clamping means for clamping said side arm means in desired operative relationship with respect to said connector means, each of said side arm means having releasable connecting means operatively connected with one end portion thereof, each of said releasable connecting means including a recess for receiving a suitable member, said recess having a V-shaped groove portion formed therein, and means for clamping a suitable member within said V-shaped groove portion, and at least one retractor blade means supported by said retractor means.

7. Apparatus as defined in claim 6 wherein each of said releasable connecting means is pivotally mounted with respect to the associated side arm means to permit attachment of the side arm means at various angles with respect to a suitable member.

8. Apparatus as defined in claim 6 wherein said retractor blade means is mounted on said connector means, said retractor blade means being freely adjustably mounted for movement pivotally with respect to said connector means as well as laterally with respect thereto, said mounting including a clamping means for clamping the retractor blade means in a desired operative position.

9. Apparatus as defined in claim 8 wherein said retractor blade means has a plurality of substantially parallel grooves formed therein, said clamping means for the retractor blade means including a sharp pointed member adjustably mounted such that the sharp pointed end thereof is adapted to fit within one of the grooves formed in said retractor blade means.

10. Retractor means for surgical use comprising a pair of spaced side arm means, connector means extending between said spaced side arm means, attaching means for adjustably attaching said side arm means to said connector means at spaced portions thereof, said adjustable attaching means comprising bodies of resilient members each of which has a pair of crossing passages formed therein, said connector means extending through one of the passages of each of said bodies, one of said side arm means extending through the other of the passages of each of said bodies, adjustable clamping means for clamping said side arm means in the particular operative relationship with respect to said connector means, said attaching means and said spaced side arm means having cooperating projections and recesses formed therein and adapted to mate with one another for resiliently holding the spaced side arm means in a particular position with respect to said connector means, retractor blade means, means for adjustably mounting said retractor blade means on said connector means between said spaced side arm means, said retractor blade means being mounted so as to be movable both pivotally and laterally with respect to said connector means for adjustment of the retractor blade means, each of said side arm means having releasable connecting means disposed at one end portion thereof, each of said releasable connecting means including a recess for receiving a suitable member, said recess having a groove portion formed therein of substantially V-shaped cross sectional configuration, and means for adjustably clamping a suitable member within said V-shaped groove portion.

11. Apparatus as defined in claim 10 wherein each of said side arm means includes an offset portion extending at substantially right angles to the main portion of the side arms means, said releasable connecting means being operatively mounted at the outer end of said offset portion.

12. Apparatus as defined in claim 10 wherein said releasable connecting means includes a member extending downwardly from the associated side arm means, said last-mentioned member having a recess opening through one side thereof with a V-shaped groove portion at the bottom of such recess, said member having a manually operated screw threaded member extending downwardly therethrough and adapted to clamp a suitable member within said V-shaped groove portion.

13. Apparatus as defined in claim 10 wherein said releasable connecting means includes a member having a portion of substantially polygonal shaped outer configuration, said side arm means each having a recess of polygonal configuration formed therein such that the releasable connecting means can be mounted in different operative positions within said polygonal shaped recess, and means for clamping the releasable connecting means in a particular adjusted position.

14. In combination, a conventional retractor including a pair of rigid arms, cross bar means connecting said rigid arms together, a first retractor blade supported by said cross bar means and extending downwardly between said rigid arms, second and third retractor blades connected respectively to the opposite end portions of each of said rigid arms in opposing relationship to one another and extending downwardly between said rigid arms, additional retractor means comprising a pair of spaced side arm means, connector means adjustably connected with said spaced side arm means, fourth retractor blade means adjustably supported by said connector means and extending downwardly between said spaced side arm means, and releasable connecting means at the outer end portion of each of said side arm means for connecting said side arm means with said rigid arms, said releasable connecting means being pivotally mounted with respect to the associated side arm means to permit relative adjustment therebetween in substantially the same plane so as to receive said rigid arms regardless of the angular relationship between said rigid arms and said side arm means, the pivotal axis of said connector means being substantially normal to the plane within which said rigid arms lie.

15. Apparatus as defined in claim 14 wherein each of said releasable connecting means includes a recess for receiving one of said rigid arms, said recess having a groove formed therein of substantially V-shaped cross sectional configuration, and means for clamping one of said rigid arms within the V-shaped groove in each of said releasable connecting means.

16. Retractor means for surgical use including a support member, blade clamp means including an upper arm portion, a spaced lower arm portion defining a space between said upper and lower arm portions, a post portion inter-connected between said upper and lower arm portions, said post portion having a channel formed therethrough directly aligned with and in communication with said space, said support member engaging one of said arm portions and extending through said channel whereby said blade clamp means is movable along said support member, a retractor blade including a clamping portion extending, through said space, said clamping portion of the retractor blade being interposed between one of said arm portions and said support means, one surface of said clamping portion of the retractor blade having projections extending therefrom, said projections having a cross sectional configuration defining a generally ratchet tooth shape, the adjacent arm portion having at least one recess formed therein complementary to said projections for receiving a projection and to retain the retractor blade in a desired adjusted position relative to said blade clamp means.

17. Apparatus as defined in claim 16 wherein said blade clamp means has at least one threaded recess formed therein through one of said arm portions for receiving a clamping member adapted to engage the clamping portion of the retractor blade for additionally holding it in operative position.

18. A retractor blade means formed of an elongated piece of flat sheet material of such a nature that it can be readily manually deformed, one outer end portion of said retractor blade means being provided with an arcuate bent-up flange for strengthening the said end portion, the side edge portions of the retractor blade means adjacent said one outer end portion also being bent-up so as to provide a smooth surface, said blade including a substantially flat clamping portion having down-turned flanges at opposite sides thereof, the end of said clamping portion being turned upwardly to provide a manual grasping portion, and a plurality of substantially parallel laterally extending grooves provided along said clamping portion.

References Cited
UNITED STATES PATENTS

| | | | |
|---|---|---|---|
| 1,311,313 | 7/1919 | Brix | 128—20 |
| 1,747,799 | 2/1930 | Straus | 128—20 |
| 2,398,306 | 4/1946 | Hermanson | 287—51 |
| 2,670,731 | 3/1954 | Zoll et al. | 128—20 |
| 2,670,732 | 3/1954 | Nelson | 128—20 |
| 2,812,759 | 11/1957 | Taylor | 128—20 |
| 3,040,739 | 6/1962 | Grieshaber | 128—20 |
| 3,078,584 | 2/1963 | Cohn | 32—20 |

OTHER REFERENCES 5,188   3/1910   Great Britain.

RICHARD A. GAUDET, *Primary Examiner.*

K. L. HOWELL, *Assistant Examiner.*